Nov. 5, 1935.  F. M. CARROLL  2,019,891
TABULATING MACHINE
Filed Sept. 29, 1928  9 Sheets-Sheet 1

Nov. 5, 1935.  F. M. CARROLL  2,019,891
TABULATING MACHINE
Filed Sept. 29, 1928  9 Sheets-Sheet 5

Inventor
Fred M. Carroll
By his Attorney

Nov. 5, 1935.  F. M. CARROLL  2,019,891
TABULATING MACHINE
Filed Sept. 29, 1928    9 Sheets-Sheet 6

Nov. 5, 1935.  F. M. CARROLL  2,019,891
TABULATING MACHINE
Filed Sept. 29, 1923  9 Sheets—Sheet 9

FIG.14.

Patented Nov. 5, 1935

2,019,891

UNITED STATES PATENT OFFICE 2,019,891

TABULATING MACHINE

Fred M. Carroll, Yonkers, N. Y., assignor, by mesne assignments, to International Business Machines Corporation, New York, N. Y., a corporation of New York Application September 29, 1928, Serial No. 309,344

8 Claims. (Cl. 235—58)

This invention relates to accounting machines and more particularly to that type employing sheet feeding and printing mechanisms.

For the purpose of illustration the present improvements are applied to tabulating machines in which items represented by perforations in record cards are entered into accumulators or printed upon a record material. In certain accounting systems it is desirable that the data entered in the accumulating devices, either items, a series of items, or the totals thereof be printed upon separate work sheets selectively controlled in accordance with certain machine adjustments.

It is therefore a broad object of the present invention to provide in combination with a machine adapted to set printing devices to represent items or totals a sheet feeding mechanism adapted to remove an individual sheet or bill from a magazine stack and present it to the printing mechanism to receive the desired impression.

It is a further object of the present invention to provide means for selectively controlling the sheet feeding mechanism to render it effective either as an incident to item or total printing. By the provision of suitable switches the improved machine may be conditioned to print each item upon a separate work sheet, or a series of such items with a total thereof upon each work sheet. An auxiliary control device controls operation of the machine for the purpose of presenting a sheet to the printing mechanism for an initial printing operation, inspection, adjustment, etc.

In connection with the sheet feeding device further objects are; to construct the feeding devices in such a manner that the sheet is held against displacement tending to minimize the possibility of the sheets passing into the working parts and disarranging the mechanisms, to provide means adjustable at will to give a variable head spacing operation to accommodate preprinted matter on the bill or sheet; to provide suitable detent mechanism for preventing overthrow of the sheet supporting roller and positively locating the roller prior to a line spacing operation; to provide selective means for varying the degree of line spacing; to provide a sheet ejecting device operable as an incident to printing operations and; to provide a sheet testing device effective to control machine operations in accordance with the presence or absence of a sheet.

The above objects are preferably attained by providing a suction device which seizes the lowermost sheet of a stack and presents the same to a pair of normally separated rollers which subsequently close upon each other to feed the sheet to a platen roller. The sheet feeding operation caused by a variable rotation of the platen roller effects the desired head space, and occurs prior to or during the time the platen roller descends to the printing position. The line spacing operation which subsequently follows brings a certain portion of the sheet to the printing line to receive an impression. As the platen roller supporting frame is elevated to its upward position to receive the next sheet, the previously printed sheet is ejected to a storage magazine, and in the present instance, sheet ejection is accomplished by imparting a rapid rotation to the sheet supporting platen roller by establishing a driving connection between the platen roller driving means and a continuously rotated driving shaft.

The sheet feeding means and line spacing devices are preferably controlled by electrically operated instrumentalities, in the nature of cam operated contacts which are closed as an incident to item or total printing operations. In the circuit including these contacts are disposed suitable controlling switches which may be selectively adjusted to effect desired machine operations, such as, printing each item upon a separate sheet, or a series of items with the total thereof upon each sheet. The testing device determines whether or not a sheet has been properly fed and controls machine operation in accordance with the result of each testing operation.

To these and other ends the invention consists in the novel features of construction, arrangement of parts and combination of elements hereinafter described and more particularly set forth in the claims.

In the appended drawings.

For the purpose of illustration the present improvements are shown in connection with a Hollerith tabulating machine but it will be understood that with slight modifications they may be embodied in other forms of accounting machines and the present showing is to be considered as illustrative rather than restrictive.

The Hollerith type of tabulator is well known in the art and exemplified in many prior patents and requires but little further description than will be given incidentally herein. As is well known, as the perforated record cards are passed through the machine one or more counters are operated to show the figures or totals of the figures represented by the perforations in the cards.

The present improvements are applied to the type of tabulating machine shown in the patent to Daly et al. #1,762,145 to which reference may be had for further details of construction and operation. However, in order to more clearly understand the invention, reference will be had to Fig. 14 which discloses a wiring diagram of the machine disclosed in this patent and illustrates the principal elements coordinated with the present improvements.

Figure 14:
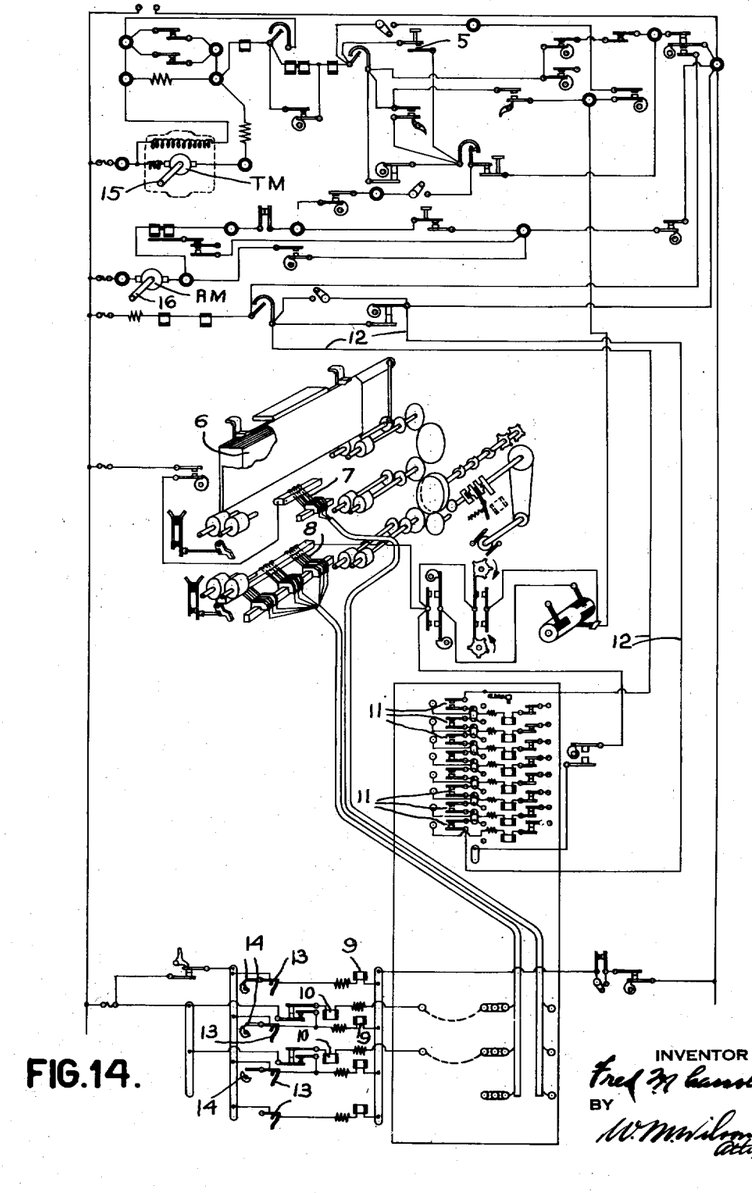
Fig. 14 is a wiring diagram of the tabulating machine to which the present improvements are applied.

As shown in Fig. 14, and more fully in the Patent #1,762,145 a tabulating motor TM driving a shaft 15 is provided which, under control of a manually operating starting key 5, is adapted to be started, thereby feeding by means of the usual card feeding devices, tabulating cards 6 so that the perforations therein are analyzed by the upper or control brushes 7 and the lower or adding brushes 8. The lower brushes are adapted to be plugged so as to control the printing control magnets 9 and the adding control magnets 10. Printing control magnets 9 are adapted to selectively call the item type 20 (Fig. 10) into operation so that a plurality of such type, which comprise the printing mechanism are adapted to print the items designated by the various controlling cards. When a series of such item printing operations are effected and when a change of group designation occurs, which is sensed by means of the upper control brushes 7 in conjunction with the lower brushes 8, tabulating operations cease. Upon change in group classification one of the group control contacts 11 will open thereby opening a control circuit 12 which will stop the operation of the tabulating motor TM and automatically start the operation of the total and reset motor RM to drive shaft 16. During the resetting and total taking contacts 13 will close at different points in the cycle depending upon the position of the stepped cam 14. The latter, as more fully described in the Patent #1,379,268, is adjusted under control of one of the adding elements controlled by the related adding magnet 10. The closure of such contacts 13 will thereby energize the printing control magnet 9 at a certain point in the cycle of operation to thereby call a printing type in operation. A plurality of type effect printing of the total of the items standing upon the accumulator elements.

During the item printing operations the listing shaft 15 (Fig. 14) is given an operation of a single revolution by the motor TM. The total taking shaft 16 is adapted to be operated after an item printing operation by the motor RM which is now effective and motor TM, ineffective, or at rest.

The printing devices whereby numerals corresponding to the perforations in particular card columns, or the amounts standing on any particular counter wheel are printed, comprises a plurality of groups of type bars 20 (Fig. 10) any one of which may be impelled by suitable hammers 21 against the platen 22 to perform the printing operations. Inasmuch as the printing device and the controlling devices therefor are not involved in the present application they are not shown in detail herein. However, for further details of construction and operation reference may be had to the patent of C. D. Lake, Patent No. 1,379,268, dated May 24, 1921.

Power for driving the various mechanisms is provided by an auxiliary motor designated in the circuit diagram (Fig. 13) by reference character 23. The driving shaft of the motor 23 is adapted to drive a pulley wheel 24 (Fig. 1) by a suitable belt connection (not shown). The sleeve carrying the pulley wheel 24 carries a pinion 26 meshing with a gear 27 loosely mounted upon a suitable stub shaft 28, the gear 27 having attached thereto a pinion 29 which is in continuous mesh with a gear 30 loosely mounted upon a driving shaft 31. The gear 27 further meshes with a pinion 32 which is loosely mounted upon a stub shaft 33a.

Affixed to the gear 32 is a pulley wheel 34 which has a belt connection 35 to a pulley wheel 36 secured to a supplemental driving shaft 37. It will be observed that as long as the auxiliary motor 23 is in operation the gears 30 and 32 will be continuously rotated but the shaft 37 will only be driven when the belt 35 is taut.

The individual sheets or cards 40 (Fig. 3) which are passed to the printing mechanism previously described for the purpose of printing suitable data thereon are placed in stack relationship upon a table 41 which is secured and pivoted by a cross rod 42 and which has at its end opposite its pivot a stop plate 43 to provide for the proper positioning of the sheets 40. A follower plate 44 is adapted to be placed upon the uppermost sheet of the stack and provides for a constant pressure upon the sheets to thereby insure proper sheet feeding operations. Pins 45 secured to the side frames act as stops to retain the table 41 in the inclined position shown in Fig. 3. The means whereby the sheets are individually fed to be received by the platen roller will be hereinafter described.

Affixed to the constantly rotating gear 30 (Fig. 1) is a ratchet wheel 46 which forms one element of a clutch. Fast to the shaft 31 is a disk 47 carrying a pawl 48 normally held out of engagement with the teeth of the ratchet wheel 46 by the engagement of the tail of the pawl 48 with a projection of an armature structure 49. When a magnet 50 is energized the armature 49 will be attracted to permit a spring 51 to be effective to rock the pawl 48 to engage the teeth of the ratchet wheel thereby causing the shaft 31 to be rotated a complete revolution. When the tail of the pawl again strikes the armature 49 which has, in the meantime, been raised to its uppermost position as an incident to the de-energization of the magnet 50, the pawl 48 will be disengaged from the ratchet wheel teeth stopping the rotation of the shaft 31 at the end of a complete revolution. Rebound or reverse rotation in a clockwise direction of the disk 47, after having been driven in a counterclockwise direction, is effectively prevented by a pawl 52 engaging a shoulder 53 of the disk 47.

The shaft 31 carries cams for operating the various mechanisms and its operability is controlled by the energization of magnet 50 which is designated as the "sheet feed magnet" since it is energized as an incident to feeding individual sheets.

Shaft 31 operates a suction pump which causes a suction tube 55 (Fig. 3) to seize the lowermost individual sheet and position it so that it may be subsequently engaged by a pair of feeding rollers. Any suitable device may be adopted for the purpose of providing the necessary suction and may be of the form disclosed in Fig. 8 wherein it will be observed that fitting within a piston cylinder 56 is a piston plunger 57 carrying in the usual manner any suitable piston ring of rubber for a seal with the inner surface of the cylinder 56. A pair of links 58 connect the piston 57 with a cross shaft 59 (see also Fig. 4) the mid-point of which is received by one extremity of a bell crank 60 pivoted on a shaft 61. Attached to the other extremity of the bell crank 60 (Fig. 8) is a coil spring 62 which is adapted to quickly elevate the plunger 57 to produce the necessary suction. The spring 62 is normally held in ineffective position by reason of the engagement of a lug 63, integral with the bell crank 60, with a cam extension 64 of a cam disk secured to shaft 31. Upon an initial clockwise movement of the shaft 31 the crank arm 60 will be released by the disengagement of the cam extension 64 with the lug 63 whereupon spring 62 will quickly elevate the plunger 57 exhausting the air within a tube 65 and producing a suction in said tube 65 the latter having a suitable air connection with the bottom of the cylinder. At the termination of the cycle of operation of shaft 31 the cam extension 64 will subsequently engage the lug 63 to depress the plunger 57 and latch it in the position shown in Fig. 8.

Figures 6, 13:
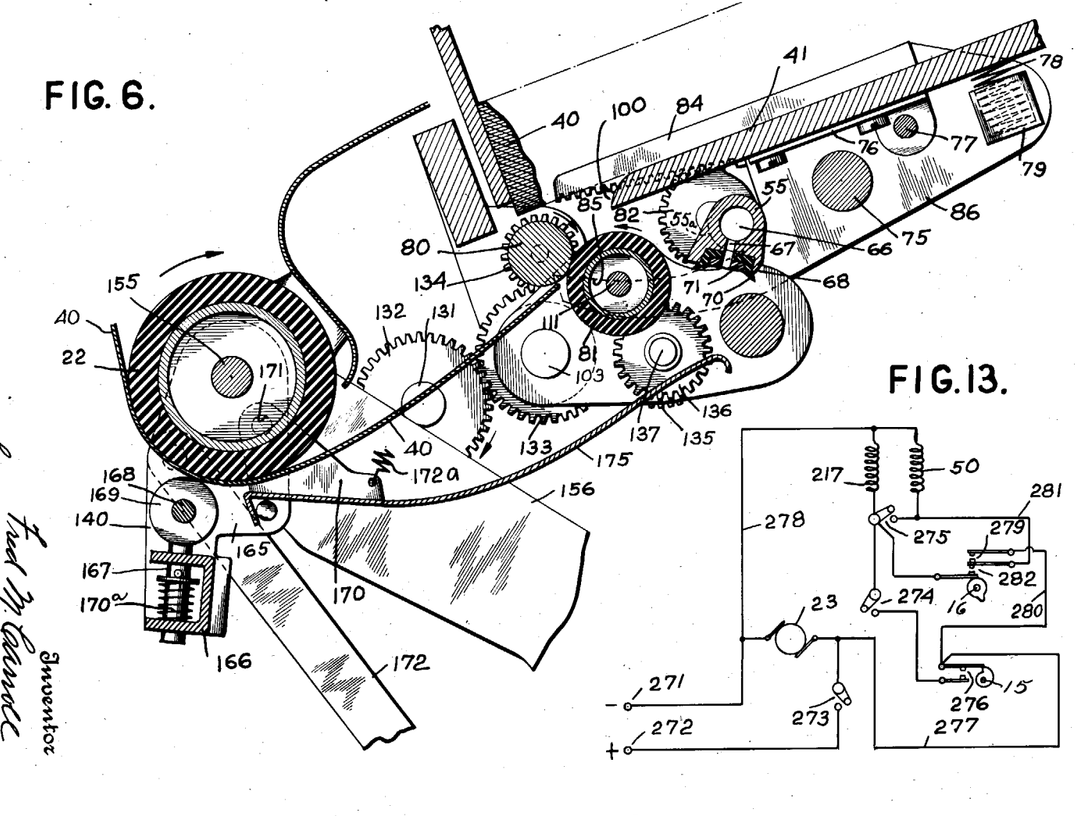
Fig. 6 is an enlarged view in side elevation showing more clearly how certain feeding rolls cooperate to convey the individual sheet to the platen roller.
Fig. 13 is a diagram of the preferred electric controlling circuit.
Figure 7:
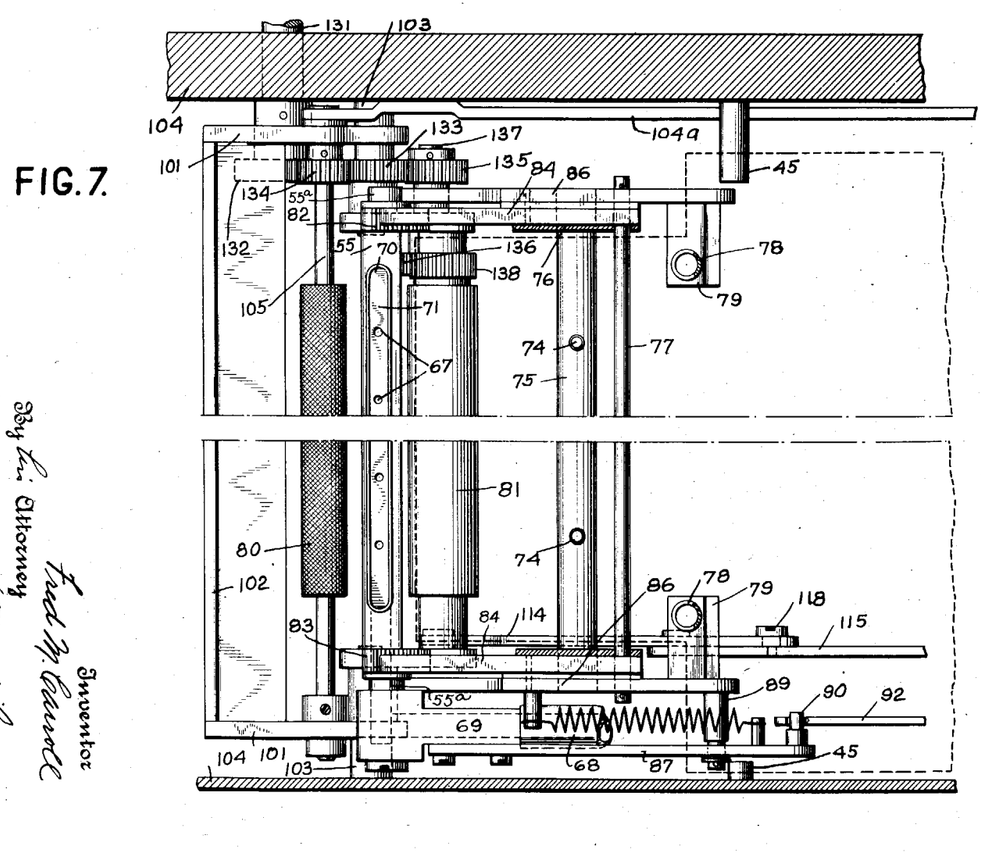
Fig. 7 is a partial plan view of the machine taken on the line 7—7 of Fig. 3.

The suction gripper tube 55 previously mentioned is provided with a central longitudinal aperture 66 (Figs. 3 and 6) and a series of radial holes 67 to provide fluid openings therewith. The longitudinal aperture 66 is sealed at one end but the other end is in fluid registration with the bore of a hose 68 (Figs. 2 and 7) by a coupling member 69 which is attached to the extreme end of one end of the tube 55. As best shown in Figs. 6 and 7, fitting within a longitudinal depression formed in part of the tube 55 is a sealing gasket 70 held in place by a longitudinal plate 71. The plate and gasket are both apertured so that their holes are in registration with the holes 67 in the suction tube 55. This construction provides an air tight gripping device which firmly seizes the individual sheets.

The means for feeding the sheets 40 separately from the stack comprises in part, the suction tube 55 which is normally in the position shown in Fig. 3 but which turns counterclockwise to the position shown in Fig. 6 and in so doing presents one end of the sheet between the normally separated rollers 80 and 81 (see Fig. 3) which are subsequently brought together as shown in Fig. 6 and as they turn oppositely, they feed the sheet further to the platen 22.

The tube 55 carries near each end a pair of mutilated gears 82 and 83 (Figs. 3, 6 and 7) and, as best shown in Fig. 6 for the gear 82, the tube is eccentrically carried by the gears 82 and 83 and such gears may be integral parts of the tube 55 or rigidly secured thereto. While gears 82 and 83 carry the tube 55 the tube is held in place by the following arrangement. The tube 55 has a pair of circular portions 55a (see Figs. 6 and 7) which rest upon a pair of curved fingers 85 holding the tube from dropping downwardly. The tube is further held by the gear teeth of gears 82 and 83 meshing with respective racks 84 (see Figs. 6 and 7) which overlie the tube 55. By such arrangement, it will be obvious that a rolling of gears 82 and 83 under racks 84 while they are stationary, will cause the eccentric turning of tube 55 from the Fig. 3 to Fig. 6 position.

Attached to the underside of the table 41 are brackets 76 having ears through which passes a rod 77 and such rod 77 extends, as shown in Fig. 7, to pass through the plates 86. Rod 77, therefore, forms the pivot for the plates 86 and racks 84 which are the side arms of a frame because a rod 75 connects such plates (see Fig. 7). To the plates 86 the racks 84 are attached so that racks 84 are pivoted by the rod 77 as well.

Figure 2:
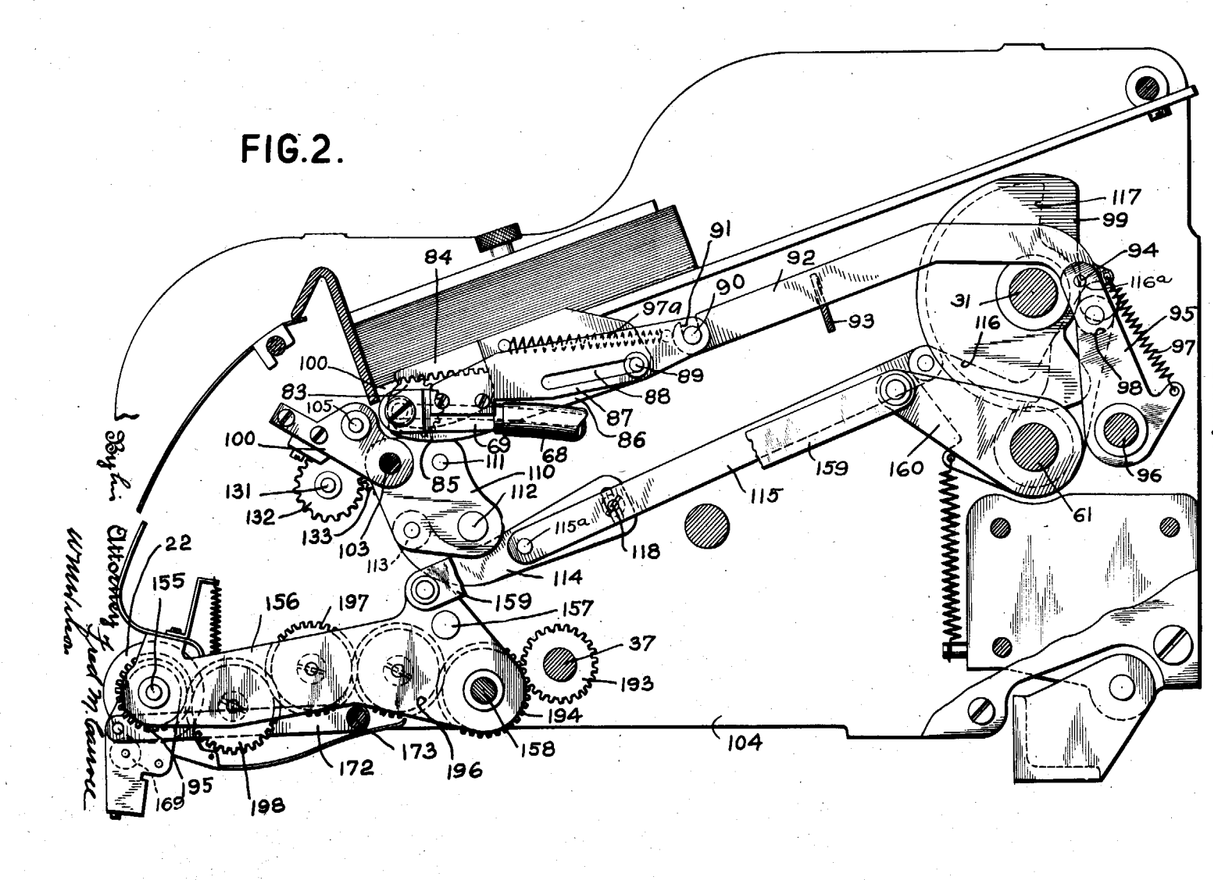
Fig. 2 is a view in side elevation of the machine and is taken on the line 2—2 of Fig. 5.
Figure 3:
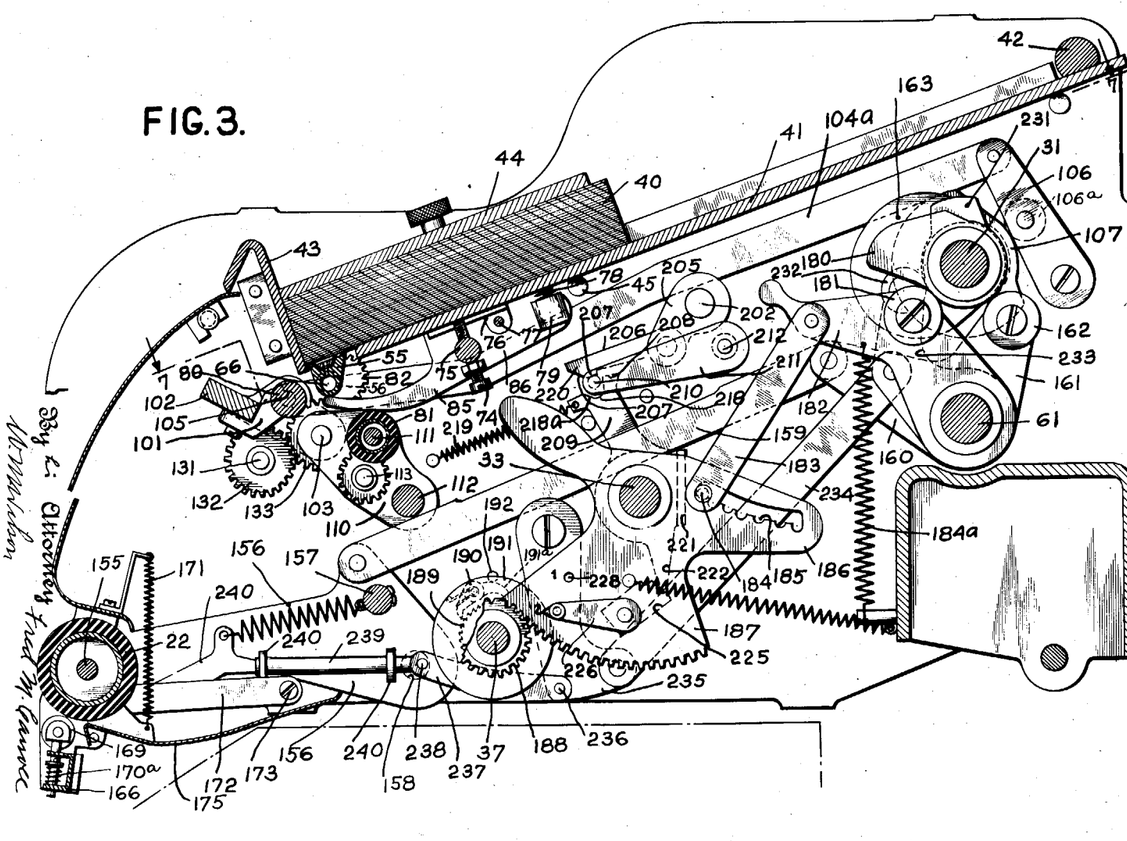
Fig. 3 is a central transverse sectional view of the machine showing particularly the arrangement and cooperation of the mechanisms provided for the purpose of effecting sheet feeding and spacing operations.

In apertures of block extensions 79 (Figs. 3 and 7) of plates 86 there are fitted springs 78 which rock the frame so that tube 55 may be positioned to engage the lowermost sheet 40 and this position may be effected by adjustment of screws 74 (Figs. 3 and 7). The fingers 85 are curved so that the concentric portions 55a of the tube 55 roll over the upper edges of the fingers so that the tube 55 rotates eccentrically about the centers of the gears 82 and 83 to bring the suction tube from the initial position shown in Fig. 3 to the rotated position shown in Fig. 6. This position of the tube is obtained by drawing the tube to the right as viewed in Figs. 3 and 6 by the following means. Secured to the hose coupling member 69 is a plate 87 (Figs. 2 and 7) guided by a slot 88 receiving a guide pin 89 secured to one of the plates 86. A pin 90 (Fig. 2) fixed to the extremity of plate 87 is received by a slot 91 formed in a plate 92 which is guided in its reciprocating movements by a slotted plate 93. The curved end of plate 92 is pinned at 94 to an arm 95 which is pivoted upon a stud 96, the plate 92 and arm 95 being interconnected by a spring 97. A spring 97a near the opposite end of plate 92 is provided to urge a follower 98 against the periphery of a profile cam 99 secured to shaft 31. The action of cam 99 is such that it reciprocates the suction tube during each operation of the machine so that the tube 55 rocks eccentrically about the gears 82 and 83. Since the suction in the tube 55 has initially seized the lowermost sheet in the stack it will, as it turns, draw the sheet through a slot 100 (Fig. 6) and roll one end of the sheet down as the rollers 80 and 81 move towards each other and engage the sheet to feed the same to the platen roller as shown in Fig. 6.

As hereinafter described, the suction will then be released suddenly, but the rollers 80 engaging one end of the sheet will prevent the sheet from springing back. As the gripper tube continues to turn, as shown in Fig. 6, it will move out of the way of the roller 81 allowing lower roller 81 to swing into contact with the upper roller 80 which also moves toward roller 81 to thus seize the sheet.

The roller 80 is carried by a frame comprised of a pair of spaced plates 101 and a cross bar 102 between said plates (Figs. 3 and 7) the plates being pivoted by studs 103 between the machine side frames 104. The frame carrying the roller 80 is adapted to be rocked about pivot studs 103 by the following means. A link 104a (Figs. 3 and 7) is received at one end by the pivot shaft 105 of the roller and is pivoted at its other end to an arm 106 which has a follower 106a cooperating with a profile cam 107 secured to shaft 31. At a certain point in the machine cycle the frame carrying the roller 80 is rocked to pass over the sheet which has been roller downwardly by tube 55.

Figure 1:
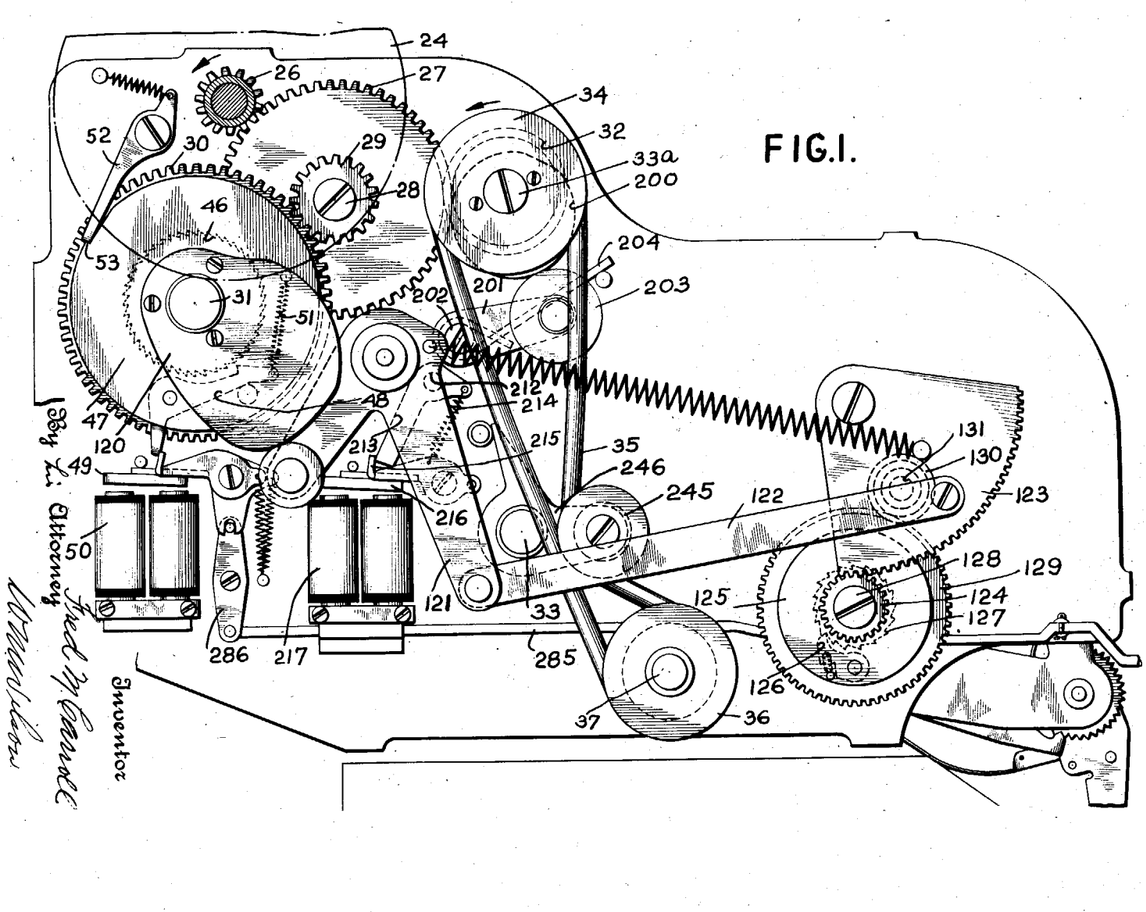
Fig. 1 is a view in side elevation of one side of the machine constructed according to the present invention.

The roller 81 is likewise carried by a frame also pivoted by studs 103 and comprises a pair of spaced plates 110 (Fig. 3) and between such plate and carried thereby is the supporting shaft 111 of the roller 81 and a cross rod 112 to constitute a frame for roller 81. Pivoted at 113 to one of the side plates 110 (Figs. 2 and 3) is a curved plate 114 which is connected by a link 115 to one arm of a bell crank 116, the latter being provided with a roller 116a or follower engaging a profile cam 117 secured to cam shaft 31. The action of the cam is such that it will rock the frame comprising side plates 110, shaft 111 and cross rod 112 to cause roller 81 to approach and contact with roller 80. To allow for the wear of cam 117 plate 114 is shifted by means now to be described. It will be observed in Fig. 2 that link 115 has a pivotal connection 115a to the curved member 114. If screw 118 is loosened so as to permit member 114 to be manually rocked in either direction about the pivot 115a (while 115 is stationary) the shaft 113 will be moved in a path concentric with pin 115a thus rocking the frame carrying roller 81 clockwise or counter-clockwise about pivot 103 varying the starting position of such roller. By tightening the screw 118 the position of adjustment of the frame carrying roller 81 may be held. When the rollers 80 and 81 contact they will feed the sheet therebetween (as shown in Fig. 6) the rollers being driven by the following mechanism. Referring to Fig. 1, securely fixed to shaft 31 is a cam 120 adapted to rock a bell crank member 121 which has a link connection 122 to a segment 123. When the segment is initially rocked by cam 120 it drives a pinion 124 and a disk 125 attached thereto.

The disk 125 carries a pawl 126 adapted to engage the ratchet teeth of a wheel 127 secured to a stub shaft 128 to which is affixed a gear 129. The latter meshes with a pinion 130 attached to a stub shaft 131 which extends through the side frame 104 (Fig. 7) and has attached thereto a gear 132 in continuous mesh with a gear 133 (see also Fig. 2) loose on one of the pivot studs 103. Gear 133 meshes with a pinion 134 (Fig. 6) secured to the feeding roller 80. Gear 133 also meshes with a gear 135 (Figs. 6 and 7). The latter is outside of one of the plates 110 and is secured to a shaft 137 journalled in that particular plate. Inside this plate and attached to shaft 137 is pinion 136 which is in continuous mesh with a pinion 138 secured to the journal shaft 111 of roller 81. Since the main driving gear 133 rotates about the pivotal centers of the roller carrying frames it will be clear that a driving operation of the rollers 80 and 81 may be effected in any position of the frames or rollers.

As rollers 80 and 81 grip the individual sheet 40 the rollers will convey the sheet to the platen 22 and a cooperating roller 140. As soon as the sheet is properly positioned under the feeding roller 80 it is desirable to have the suction tube release its grasp upon the sheet and to this end a relief valve 150 (Fig. 8) is provided. This valve is pivoted at 151 and is normally urged by a spring 152 so that its flap normally seals or closes a port hole 152a of a pipe 153 which forms the connection between the base of the cylinder housing 56 and the hose 68. At a certain point in the operation of a disk 154 secured to shaft 31 a projection thereof will rock the valve 150 to open the port hole, admitting air and destroying the suction.

Figure 4:
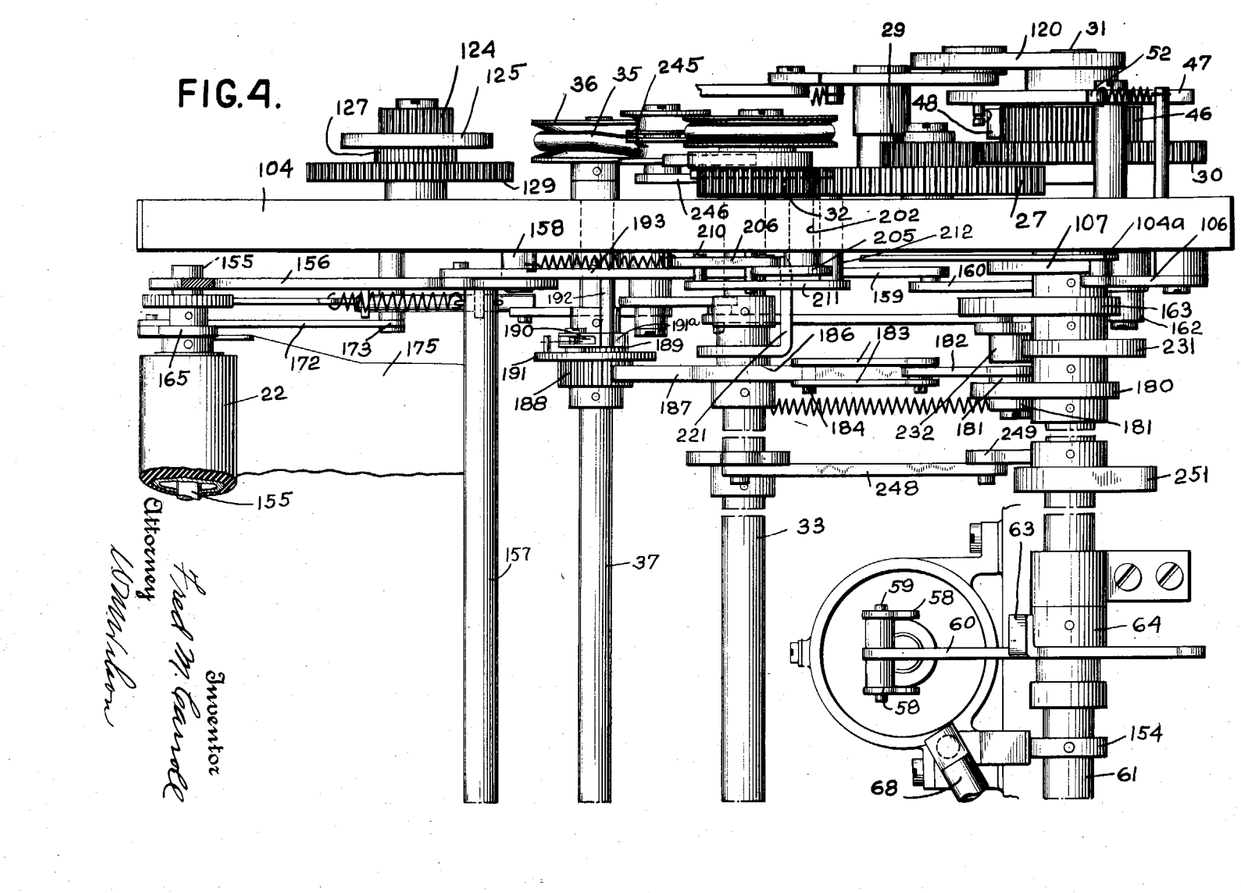
Figs. 4 and 5 when placed together disclose a top plan view of the assembled machine, certain parts having been removed or broken away to more clearly illustrate the arrangement of other parts.
Figure 5:
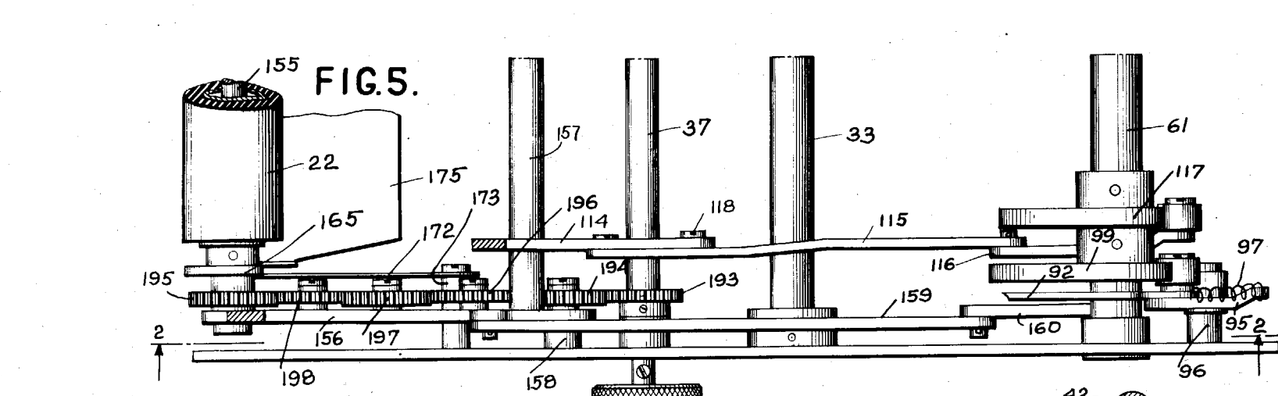

The platen 22 is normally in the position shown in Fig. 2 and is elevated at a certain point in the operation of the machine to receive the sheet and is then returned to its normal position to carry the sheet to the printing line. The platen roller 22 is rotatably mounted on a shaft 155 (Figs. 2, 4 and 5) journalled in a pair of spaced frame plates 156 joined together by a cross rod 157 which elements 155, 156 and 157 form a platen supporting frame pivotally mounted by pivot studs 158 (Figs. 4 and 5).

The preferred means for reciprocating the platen roller supporting frame comprises a pair of links 159 (Figs. 2 and 3) each of which is pivoted at one end to its respective side plate 156 and at its other end to an arm 160 secured to shaft 61. One of the arms 160 has an integral arm 161 (Fig. 3) carrying a follower 162 cooperating with the periphery of a profile cam 163 secured to the drive shaft 31.

A pair of spaced plates 165 (Figs. 4, 5 and 6) are dependently hung from the platen roller supporting shaft 155 and are joined together by a square channelled cross bar 166 in which is slidably mounted a plurality of spring urged rods 167 which carry a shaft 168 on which is mounted a plurality of rollers 169. It will be clear that the springs 170a will urge the rollers 169 in frictional contact with the platen roller. To each of the plates 165 is connected one end of a related link 172 (Figs. 2, 3, 4 and 5) each of which is anchored at one end to a fixed stud 173 (Fig. 2). As the frame carrying the platen roller is elevated these links act to slightly rock the frame 165—166 carrying rollers 169 in a counterclockwise direction (as shown by a comparison of Figs. 2 or 3 with 6) about the platen roller shaft and during this movement the rollers 169 continue to frictionally engage with the platen roller due to the action of springs 170a.

When the cam 163 elevates the platen roller supporting frame to the position shown in Fig. 6 the sheet fed thereto by rollers 80, 81 will strike and be guided by a flexible plate 175 to pass between the platen roller 22 and the cooperating rollers 169 to be fed about the platen roller as the latter is driven by means to be presently described. Guide plate 175 is an integral portion of side plates 170 which are pivoted at 171 to each side plate 165, and the guide plate is urged upwardly by a spring 172a to resiliently urge the sheet into cooperation with the rollers 22—169.

Attached to the drive shaft 31 is a cam 180 (Fig. 3) in engagement with a follower 181 of an arm 182 loose on rod 61. Depending from the extremity of the arm 182 is a pair of spaced links 183 (Fig. 4) joined by a cross pin 184 which is urged by a spring 184a to be retained in any one of a series of notches 185 in an extension 186 of a segment 187 loosely mounted on shaft 33. The teeth of the segment 187 mesh with a pinion 188 loose on shaft 37 and are adapted to drive a ratchet wheel 189 fixed to shaft 37 by means of a one-way clutch comprising a pawl 190 mounted on a disk 191 which latter is attached to the pinion 188.

The operating end of pawl 190 is normally held out of engagement with the teeth of the ratchet wheel teeth by a pin 192 (Fig. 3) normally in engagement with an arm 191a integral with the pawl but upon an initial movement of disk 190 the arm 191a of the pawl will be removed from the pin 192, which as shown in Fig. 4 is attached to the side frame 104, so as to effect a driving engagement between the pawl and ratchet wheel 189. The shaft 37 has secured to it a gear 193 (Figs. 2 and 5) meshing with a gear 194 loose on one of the pivot studs 158 of the platen roller supporting frame. From the gear 194 motion is communicated to the gear 195 (see Fig. 5) secured to the platen roller shaft 155 by a gear train comprising gears 196, 197 and 198 which are intermediate the gears 194 and 195 and which gears 196, 197 and 198 are carried by one of the side plates 156. Since the main driving gear 194 is pivotally mounted at the pivotal center of the plate supporting frame, rotary motion to the platen roller may be imparted in any position of the frame but in the present arrangement is performed at the time the frame is in its uppermost position (Fig. 6). The cross pin 184, as previously stated, may be manually shifted so as to enter any one of a series of notches 185 at different distances from the center of shaft 33 so that for a given movement of arm 182 a variable displacement of segment 187, and a proportional rotation of shaft 37 may be secured and thus the desired head spacing of the sheet fed to the rollers may be provided to accommodate the preprinted matter usually provided at the top of the sheets. When the sheet is between rollers 22 and 169 and fed the desired amount the platen frame descends carrying the sheet to the printing mechanism to effect the desired imprint upon the sheet by the selected type 20 (Fig. 10) when the platen has positioned at the printing line the first line of the sheet to be imprinted.

When more than one line of printing occurs on the sheet it is desirable to suitably feed the sheet slightly to prevent overprinting and to space the data printed. To this end there is secured to the gear 32 an eccentrically mounted cam disk 200 (Fig. 1) which constantly rotates to give a reciprocating motion to an arm 201 secured to a stub shaft 202, said arm being urged by a spring 204 to cause its follower 203 to constantly engage the periphery of the cam disk 200.

The shaft 202 as it is journalled in the side frame 104 passes through the side frame 104 (Fig. 4) and has secured thereto an arm 205 (Fig. 3) to which is pivoted an actuating pawl 206 having a projection 207 adapted to engage an extension 208 of an arm 209 but which is normally held up in disengaged position by a pin 210 in the plane of the pawl 206 and which pin is carried by an arm 211 secured to a rod 212. The rod 212 likewise passes through frame plate 104 (Fig. 4) and has secured thereto a bell crank 213 (Fig. 1) which is urged by a spring 214 to rock the shaft 212 to lower pin 210 to cause an engagement between the projections 207 and 208, but such operation is prevented by the engagement of one arm of bell crank 213 with an upturned extension 215 of an armature structure 216 of a magnet 217. In the present instance the latter is energized as an incident and prior to printing operations so that the first line spacing operation ensues after the sheet has been fed by the rotation of platen 22 which is effected by segment 187. A subsequent line spacing operation immediately follows each printing operation. When the magnet 217 is energized the armature structure 216 will be attracted to remove extension 215 from the bell crank member 213 whereupon spring 214 rocks the member 213 and shaft 212, lowering arm 211 (Fig. 3) to bring pin 210 in a cutaway portion 218 of arm 209. Extension 207 now abuts the extension 208 so that as pawl 206 reciprocates the arm 209 will be rocked against the action of a spring 219. As pawl 206 returns, arm 209 will follow and a beveled edge 220 of the end of the pawl will engage the pin 210, (which in the meantime has been raised by a cam edge 218a forward of the notch 218) to thereby elevate pawl 206 to the position shown in Fig. 3. Elevation of arm 211 will permit the bell crank member 213 to be relatched by extension 215, as the armature structure of the deenergized magnet 217 returns to its normal upward position. The arm 209 is an integral part of a yoke 221 having a tail portion 222 (Fig. 9) adapted to engage, when shifted to the left (Fig. 9), either a shoulder 223 or a notch 224 of a block 225, depending upon the manual position of adjustment of a setting lever 226.

The lever 226, which is composed of a spring plate, may be locked in either of two positions by a pin 227 attached thereto engaging either one of two holes 228 in the segment 187. When the lever is in the position shown in Fig. 9 and yoke 221 rocked, a lost motion between the tail 222 and the shoulder 223 will permit the tail 222 to be moved a considerable distance before it actuates the block 225 and the segment 187, to effect a slight rotation of the platen by the train of mechanism previously described. This will result in a single line spacing operation. When the lever is in the "2" position (see Fig. 3) a double line spacing operation will occur since the tail is in direct contact with the edges delimiting the notch 224.

In order to eject the printed sheet, a rapid rotation of shaft 37 (Fig. 1) is effected by the belt 35 when the latter is tightened by a belt tightener pulley 245. This pulley is carried by an arm 246 (Figs. 1, 4 and 8) secured to the shaft 33 to which shaft is secured an arm 247 connected by a link 248 to an arm 249 loose on shaft 61. The arm 249 has a lug 250 in the plane of a cam 251, which cam engages the lug 250 at a desired point in the cycle of rotation of cam 251 rotatable with shaft 31, to rock said arm 247 and, therefore, shaft 33, against the tension of a connected spring 252. Rocking of shaft 33 will cause roller 245 to take up the slack in the belt 35 so that the latter frictionally drives the pulley 36 (Fig. 1), thus driving shaft 37 to impart a high speed of rotation to platen roller 22. This will result in the ejection of the printed sheet between rollers 22 and 169 during the initial elevation of the platen supporting frame and further movement of the frame positions the platen to receive another but blank sheet. The sheets may be conveyed to any suitable magazine stack. At other times in the cycle the belt 35 is slackened to permit free rotation of the platen roller for giving the desired head and line spacings.

Figures 8, 9, 10:
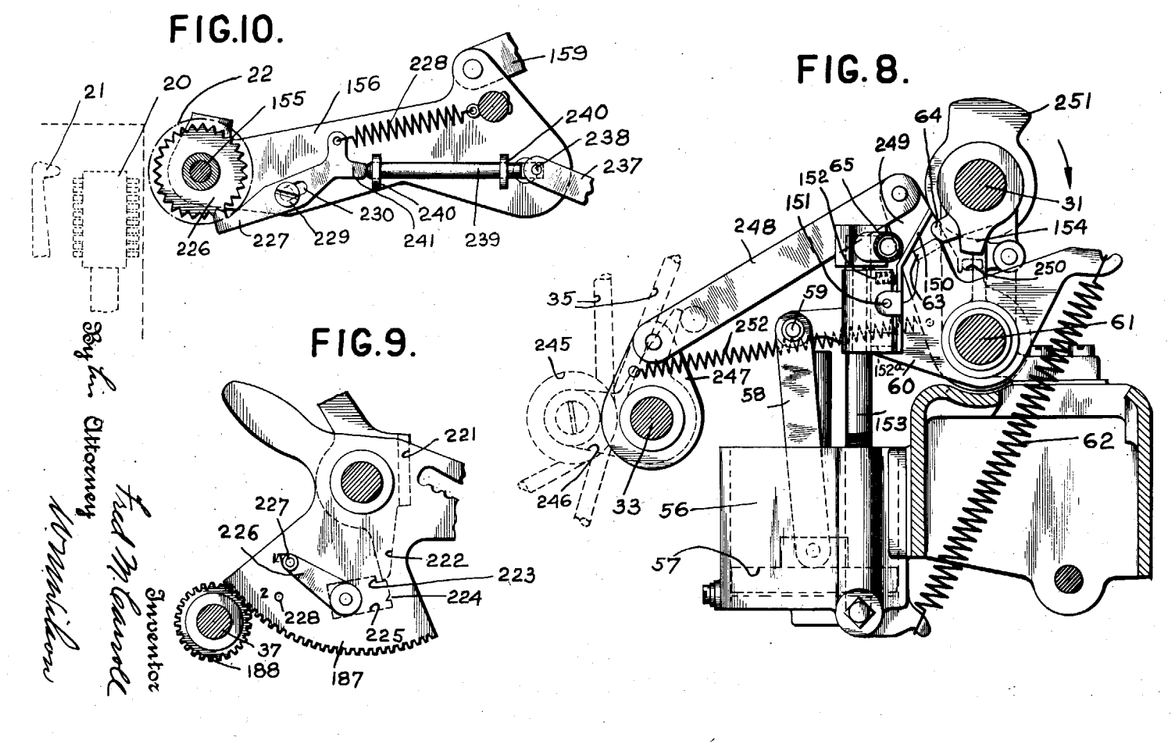
Fig. 8 is a detail view illustrating details of construction of the suction pump device and the air entrance valve associated therewith.
Fig. 9 is a detail view in side elevation showing the mechanism provided for selectively controlling the degree of line spacing operations.
Fig. 10 is a partial detail view of the detent mechanism associated with the platen roller.

Attention is directed to the provision of a detent mechanism shown in Fig. 10 for impositively locking the platen roller at desired times. Secured to the platen roller supporting shaft 155 is a ratchet wheel 226 against which bears a pawl 227 held or urged impositively to engage the interdental spaces of the ratchet wheel by a spring 228. The pawl is pivoted by means of a screw 229 received by an elongated slot 230 in said pawl. The detent mechanism is normally in the position shown in Fig. 10 and impositively holds the platen during printing time, but the pawl 227 is brought out of engagement with the ratchet wheel during the time the platen roller is quickly rotated to eject a sheet by the following means. Secured to shaft 37 is a cam 231 (Fig. 3) cooperating with a follower 232 of an arm 233 loose upon rod 61 and said arm having a link connection 234 with the extremity of an arm 235. The arm 235 is connected by a pin 236 to a curved plate 237 which is also connected by a pin 238 (see Fig. 10) to a plunger 239 slidably mounted in holes in a pair of ears 240 attached to one of the side plates 156. The plunger 239 abuts an extension 241 of the pawl 227. Prior to sheet ejecting time, the cam 231 acts upon the arm 233 to shift the plunger 239 thereby forcing the pawl against the tension of connected spring 228, inclination of slot 230 and pin 229 engaging said slot acting to disengage the pawl 227 from the teeth of the ratchet wheel 226. After the sheet is ejected cam 231 permits spring 228 to move the pawl into cooperation with the ratchet wheel teeth 226 to align the platen roller and hold the same impositively. The cam 231 then acts to disengage the pawl 227 from the ratchet wheel to permit a free movement of the platen roller during the time it rotated for a head spacing operation. Immediately upon the termination of the latter operation the pawl reengages the ratchet wheel thus effectively preventing overthrow of the platen roller and impositively holding and aligning the platen. The pawl 227, however, engaging ratchet wheel 226 at each line spacing operation permitting one or more steps of rotation of the roller as governed by the interdental spaces of the ratchet wheel.

Figures 11, 12:
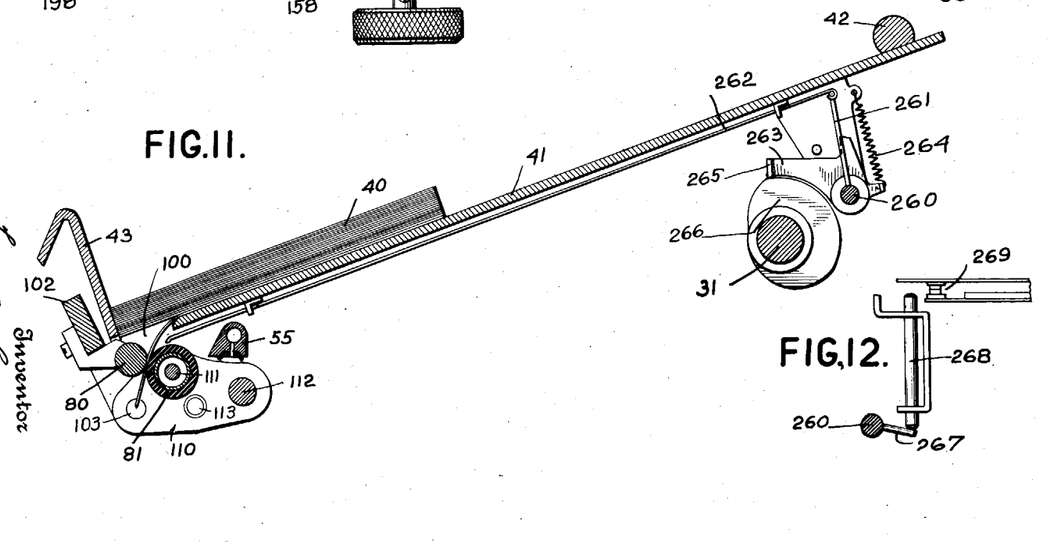
Fig. 11 is a detail view in side elevation of the testing device arranged for the purpose of controlling the operability of the machine in accordance with the presence or absence of a paper sheet.
Fig. 12 is a detail view of the contact operating device which forms part of the sheet testing mechanism.

A detecting device may be incorporated in the present improvements to control machine operation in accordance with the presence or absence of a sheet. Referring particularly to Fig. 11, radially mounted on a rod 260 is a wire yoke 261 to which is connected a plurality of slidably mounted sheet detecting wires 262. The ends of such wires terminate adjacent the feeding plane of the sheets. Secured to rod 260 is a plate 263 urged by a light spring 264 so that a lug 265 cooperates with and follows the periphery of a cam 266 on shaft 31. When the cam rotates in a clockwise direction plate 263 will rock, the lug 265 during the initial clockwise rotation of cam 266 dropping to the low part of the cam. If a sheet should be in the path of the wires 262 shaft 260 will be stopped during its rocking movement but if no sheet is present shaft 260 will rock still further. When the rod 260 is rocked, a pin 267 secured thereto will elevate a plunger 268 and the maximum rocking movement, incidental to the absence of a sheet, will cause the plunger to separate a pair of contacts 269. The rocking of shaft 260, as permitted by the presence of a sheet, will not be sufficient to open contacts 269. Thus if a sheet is not properly fed, the tabulating machine may be suitably controlled by stopping of the same. The contacts 269 may be in series connection with the electric stop circuit of the tabulating motor, as fully disclosed in the Lake Patent No. 1,379,268, to stop the tabulating motor upon failure to feed a sheet.

Referring to the preferred circuit diagram (Fig. 13) it will be seen that current from the positive line side 272 and negative line side is supplied to motor 23 of the paper feeding attachment for the tabulator when a switch 273 is closed.

When the machine is to print a single item on a sheet, which item is represented by a single tabulating card, switches 274 and 275 are closed. Contacts 276 control such operations and are controlled by the listing shaft 15 of the machine, which shaft 15 is turned for each item printing operation from a tabulating card.

Assuming that there is a sheet around the platen and positioned as shown in Fig. 6, the printing elements will effect an item imprint on the same. After such operation contacts 276 will close. The circuit now extends from the positive side 272, switch 273 now closed, wire 277, contacts 276 now closed, switches 274 and 275, now closed to the sheet feeding magnet 50 and thence to the negative line side 271. While a circuit extends to paper spacing magnet 217, the latter will cause a line spacing operation of one line but magnet 50 will cause the platen to overrun this single line space by the operation of the previously described ejecting mechanism. Magnet 50, therefore, causes ejection of the sheet with the single item printed thereon, and causes the platen to receive a new sheet to repeat the operation.

To list a series of items upon a sheet and eject the same as an incident to printing a total thereon, switch 274 is closed but switch 275 is opened. When a sheet is positioned at the printing line impulses controlled by contacts 276 closed by a cam on the listing shaft will pass through closed switch 274 energizing magnet 217 as an incident to each printing operation to successively line space the items on a sheet. When the machine is conditioned for total printing, total contacts 279 will close by means of a cam on the total taking shaft 16, thereby extending the circuit from wire 277, wire 280, closed contacts 279, wire 281, through magnet 50, which will cause the sheet to be ejected when a total is printed thereon and a following blank sheet presented to the printing type. A paper feeding operation following the last printed item will be effected by contacts 282 also closed by the cam driven by the total taking shaft and which establishes a circuit from wire 277, wire 280, through contacts 279 and 282 now closed, wire 283, to paper spacing magnet 217.

For manually controlling clutching of shaft 31 (Fig. 1) to present the first sheet of a supply stack to the printing mechanism a slide 285 is provided. One end of said slide rocks the armature structure 49 through an intermediate member 286 so that when rocked by pushing inward of the slide 285 the clutch will be engaged to perform a sheet feeding operation just as if magnet 50 was energized.

While there has been shown and described and pointed out the fundamental novel features of the invention as applied to a single modification it will be understood that various omissions and substitutions and changes in the form and details of the device illustrated and in its operation may be made by those skilled in the art without departing from the spirit of the invention. It is the intention to be limited therefore only as indicated by the scope of the following claims.

I claim:

1. In an accounting machine, the combination of a printing mechanism for automatically printing a series of items and a related total upon a work sheet, a platen roller carrying said work sheet, means for feeding a work sheet from a supply stack to said platen roller, means for rotating said platen roller, means for initially operating said platen rotating means to cause the first item imprint to be made at the desired line of the work sheet, other means operable for causing the automatic operation of the platen rotating means to line space subsequent item imprints, and still further means operable when a total is printed for causing the automatic operation of the platen rotating means to cause the ejection of the printed work sheet.

2. In a machine of the class described, in combination, an operating mechanism inoperative during the printing of items, means for causing said operating mechanism to be rendered operative only when printing a total on a sheet, a platen carrying said sheet, a ratchet wheel rotatable with said platen, a detent device, means rendered operative by said operating mechanism to rotate said platen initially a predetermined distance to determine the location of the first item imprint, means for rotating said platen to eject the sheet upon printing a total, means for causing said detent device to impositively engage said ratchet wheel during printing of items, and means operated by said operating mechanism for holding said detent device free of said ratchet wheel during the initial rotation of said platen and during the rotation of the latter to eject said sheet.

3. In a machine of the class described, in combination, a constantly rotating shaft, an operating mechanism normally inoperative during the printing of items on a sheet, means for causing said operating mechanism to be operative when printing a total on said sheet, a platen carrying said sheet, a train of mechanism operated by said operating mechanism for rotating said platen a predetermined extent for an initial imprint and including adjustable means for varying the extent of rotation of said platen, and means operated by said constantly rotating shaft and operative through a part of said train of mechanism for rotating said platen to line space successive item imprints.

4. The invention set forth in claim 3 and including in combination, a normally loose driving connection between said constantly rotating shaft and said platen, and means for causing said driving connection to be effective to rotate said platen for ejecting said sheet when a total is printed thereon.

5. In a machine of the class described, in combination, a printing mechanism, means for determining the printing of totals on a sheet by said printing mechanism, a platen carrying said sheet, a platen rotating shaft, a driving shaft therefor, a normally slackened belt connection between said shafts, and means rendered effective by said total printing determining means for rendering the belt connection taut.

6. In a machine of the class described, in combination, a platen carrying a sheet, a platen rotating shaft, a driving shaft, a normally loose belt connection between said shafts, means for causing an item printing operation on a sheet, means for determining the printing of a total on a sheet, and selective means whereby either of said means renders the belt connection taut.

7. In a machine of the class described, in combination, a sheet receiving means, a device adapted to seize one of a series of work sheets and present one of said sheets to said sheet receiving means a sheet detecting device arranged to determine whether a sheet is fed by said device to said means, item printing determining mechanism, total printing determining mechanism, and means rendered effective by either of the last named mechanisms for causing said detecting device to operate.

8. In a machine of the class described, in combination, an operating mechanism inoperative during the printing of items on a sheet, a platen, means operative during a single operation of said operating mechanism to cause the rotation of said platen to eject a printed work sheet and to cause a subsequent work sheet to be presented to said platen, a drive means for said operating mechanism, means effective when a total is printed on the sheet for coupling said drive means with said operating mechanism, and means effective when items are printed on the sheet and operated by said drive means to rotate said platen to space item imprints.

FRED M. CARROLL.